No. 732,432. PATENTED JUNE 30, 1903.
N. NEWMAN.
NUT LOCK.
APPLICATION FILED SEPT. 24, 1902.
NO MODEL.
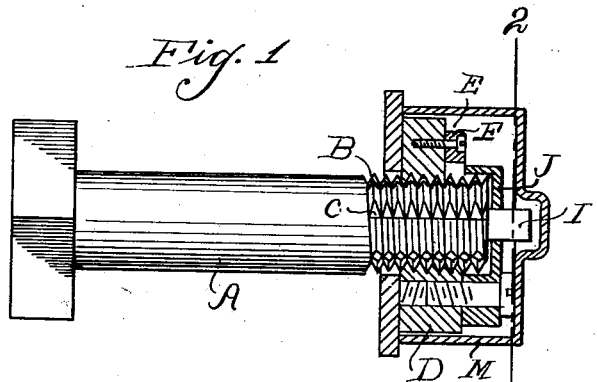
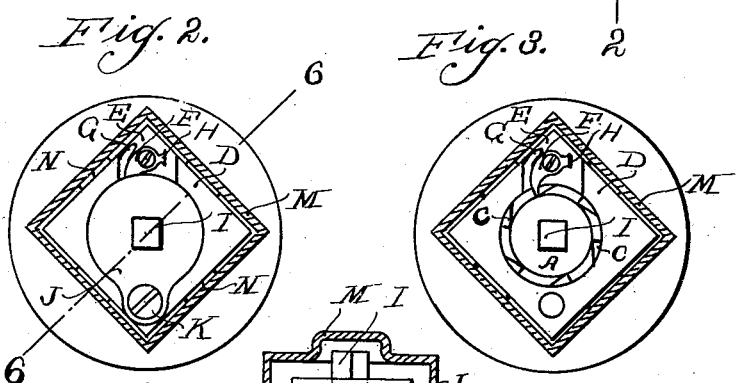
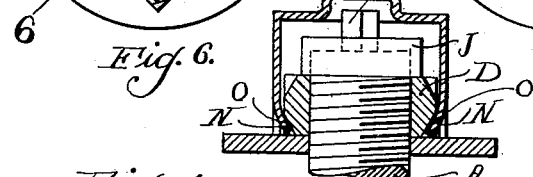
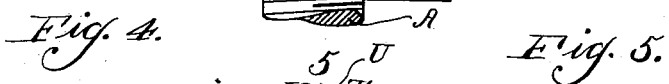
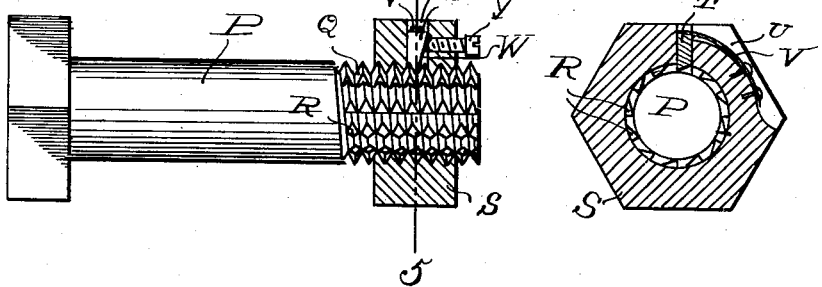
Witnesses:
E. F. Wilson
Wm. B. Snowhook
Inventor:
Naftaly Newman
By Rudolph Wm. Lotz
Attorney.

No. 732,432. Patented June 30, 1903.

UNITED STATES PATENT OFFICE.

NAFTALY NEWMAN, OF CHICAGO, ILLINOIS.

NUT-LOCK.

SPECIFICATION forming part of Letters Patent No. 732,432, dated June 30, 1903.

Application filed September 24, 1902. Serial No. 124,631. (No model.)

*To all whom it may concern:*

Be it known that I, NAFTALY NEWMAN, a citizen of the United States, residing at Chicago, in the county of Cook and State of Illinois, have invented certain new and useful Improvements in Nut-Locks; and I do hereby declare the following to be a full, clear, and exact description of the invention, such as will enable others skilled in the art to which it appertains to make and use the same.

My invention relates to a novel construction in a nut-lock, the object being to provide an efficient device of this character; and it consists in the features of construction and combinations of parts hereinafter fully described and claimed.

In the accompanying drawings, illustrating my invention, Figure 1 is a view, partly in longitudinal section and partly in elevation, showing a nut-lock constructed in accordance with my invention. Fig. 2 is a transverse section of same on the line 2 2 of Fig. 1. Fig. 3 is a similar section with a plate shown in Fig. 2 removed. Fig. 4 is a view similar to Fig. 1, showing a modified form of construction. Fig. 5 is a section on the line 5 5 of Fig. 4. Fig. 6 is a detail section on the line 6 6 of Fig. 2.

Referring now to said drawings, A indicates a bolt provided at one end with the threads B, which latter are intersected by longitudinal grooves C, thus dividing the threads into a series of ratchet-teeth. The said threads B are adapted to receive a nut D, which is provided in its outer face with a recess E, in which a spring-actuated pawl F is pivotally mounted, which is adapted to engage the ratchet-teeth to prevent reverse motion of the nut. The said pawl is held in engagement with the threads by means of a small spring G and is provided at its free end with a projection H, by means of which it may be turned out of engagement of the threads in an obvious manner, and thus release the nut. The said bolt A is further provided at its threaded end with a square projection I, which is adapted to pass through a square opening in a pear-shaped plate J, which is recessed in its inner face to receive the outermost threaded end of the bolt. The said plate J is provided in its smaller end with an opening to receive a screw K, adapted to enter a threaded opening L in the nut D, thereby obviously firmly locking said nut D in place. To protect said nut D and the locking devices, I provide a sheet-metal cover M, which fits closely over the nut D and is provided in one or more of its walls with spring-tongues N, which enter and engage recesses O in the outer faces of the nut D.

The modified form of construction shown in Figs. 4 and 5 consists of a bolt P, provided on the outer end portion of its shank with threads Q, which are similarly divided by longitudinal grooves R to form ratchet-teeth. The nut S is provided with a radial recess, in which a dog T is longitudinally movable. In its outer face said nut S is provided with a recess U, in which a spring V is mounted, which engages and normally holds said dog in engagement with said ratchet-teeth. The said dog is provided with one inclined face W, which is adapted to be engaged by a set-screw Y, mounted in a threaded opening in said nut, and when screwed forward will thereby force the dog out of engagement with said ratchet-teeth to release the nut.

I claim as my invention—

In combination with the bolt and nut, said nut being formed on its outer face with inclined recesses, a locking means carried by the nut and engaging the bolt, and a metal cover closely fitting over the said nut, the walls of said cover being formed with spring-tongues engaging the inclined recesses of the nut, the outer or closed end of the said cap engaging and thereby preventing the removal of the said locking means.

In testimony whereof I affix my signature in presence of two witnesses.

NAFTALY NEWMAN.

Witnesses:
RUDOLPH WM. LOTZ,
E. F. WILSON.